United States Patent [19]
Coffy

[11] Patent Number: 5,462,408
[45] Date of Patent: Oct. 31, 1995

[54] BLADE MADE OF THERMOPLASTIC COMPOSITE, IN PARTICULAR FOR DUCTED TAIL ROTOR OF A HELICOPTER, AND ITS METHOD OF MANUFACTURE

[75] Inventor: René L. Coffy, Sausset les Pins, France

[73] Assignee: Europcopter France, Marseille, France

[21] Appl. No.: 165,862

[22] Filed: Dec. 14, 1993

[30] Foreign Application Priority Data

Dec. 23, 1992 [FR] France ................... 9215607

[51] Int. Cl.⁶ .................................................. B64C 27/48
[52] U.S. Cl. ................... 416/134 A; 416/168 R; 416/226; 416/230; 416/239; 29/889.71; 264/250; 264/257; 264/261; 264/275
[58] Field of Search ............... 416/168 R, 226, 416/229 R, 230, 239, 134 R, 134 A; 29/889.21, 889.6, 889.71, 889.72; 264/250, 255, 257, 261, 265, 267, 275

[56] References Cited

U.S. PATENT DOCUMENTS

| | | |
|---|---|---|
| 3,594,097 | 7/1971 | Moville et al. ............ 416/134 A |
| 4,299,538 | 11/1981 | Ferris et al. ............ 416/134 A |
| 4,626,172 | 12/1986 | Mouille et al. .. |
| 4,626,173 | 12/1986 | Mouille et al. .. |
| 4,639,284 | 1/1987 | Mouille et al. .. |
| 4,892,462 | 1/1990 | Barbier et al. .. |
| 4,990,205 | 2/1991 | Barbier et al. .. |
| 5,042,968 | 8/1991 | Fecto ............ 416/226 |
| 5,074,753 | 12/1991 | Covington et al. ............ 416/229 R |
| 5,375,324 | 12/1994 | Wallace et al. ............ 29/889.21 |
| 5,378,109 | 1/1995 | Lallo et al. ............ 416/226 |

FOREIGN PATENT DOCUMENTS

| | | |
|---|---|---|
| 0212724 | 3/1987 | European Pat. Off. . |
| 0296014 | 12/1988 | European Pat. Off. . |
| 0396456 | 11/1990 | European Pat. Off. . |
| 1443155 | 5/1965 | France . |

OTHER PUBLICATIONS

Design Engineering—Jul. 1987—232—London—pp. 49–51.

Primary Examiner—Edward K. Look
Assistant Examiner—Christopher Verdier
Attorney, Agent, or Firm—Larson & Taylor

[57] ABSTRACT

The blade has its lower-surface and upper-surface skins of its shell, its front and rear filling bodies and its spar made of a composite material having the same thermoplastic matrix, preferably made of PEEK, reinforced preferably with carbon fibres. The spar is extended outside the shell by an integrated rooting part with linkage attachment, in a loop or laminate, in the same thermoplastic composite. The method consists in assembling, by melting, under pressure, all the thermoplastic composite components of the blade, in a single step after manufacturing these components in the form of prefabricated elementary pieces.

19 Claims, 5 Drawing Sheets

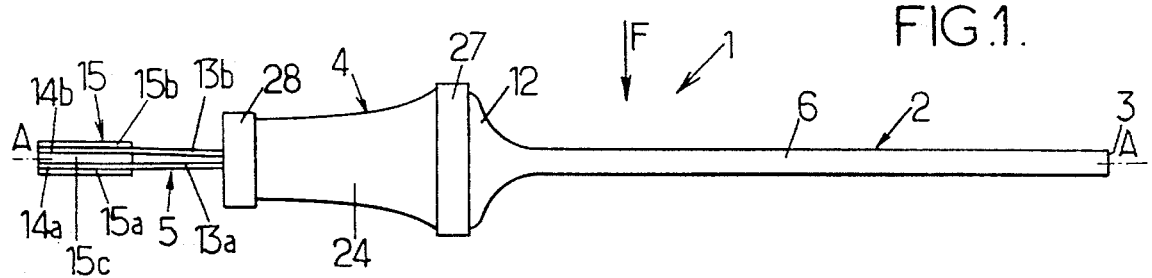
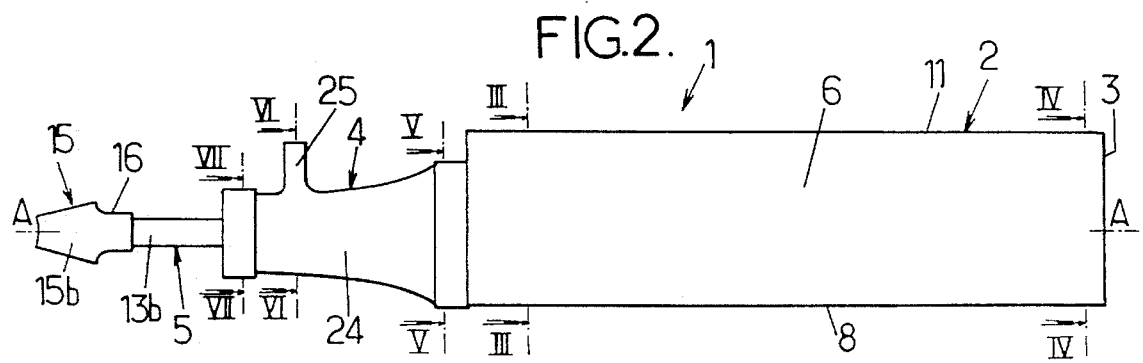
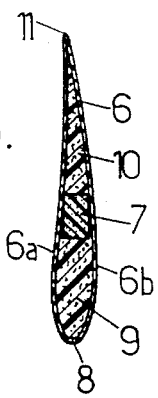
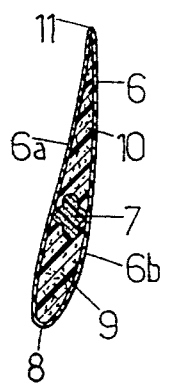
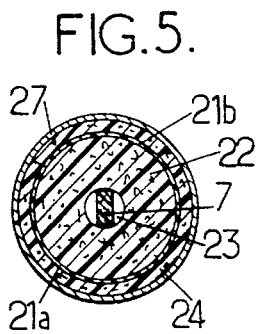
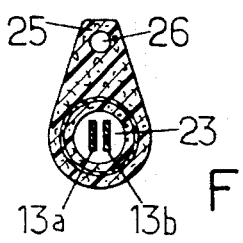
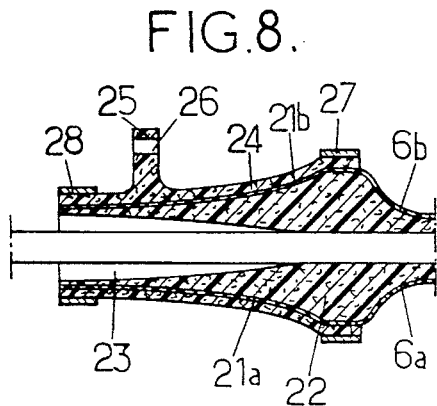

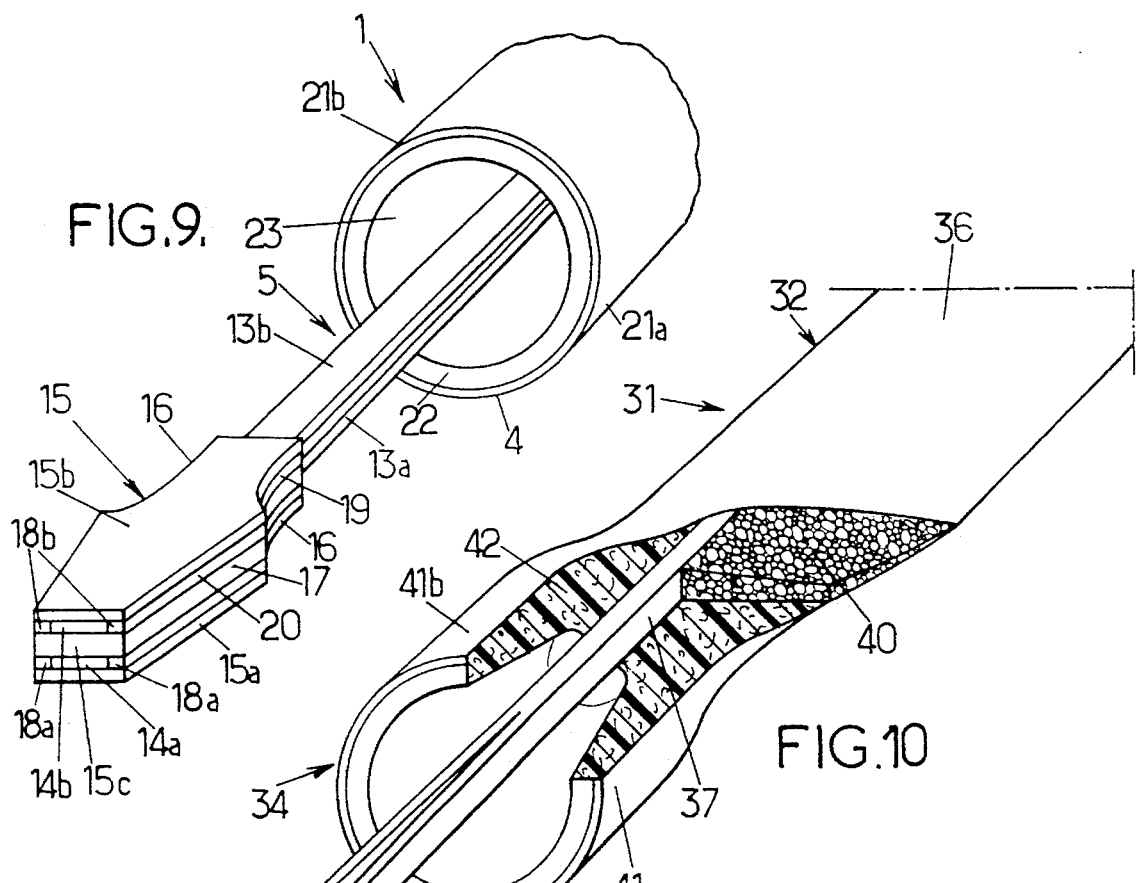
FIG. 9.
FIG. 10.
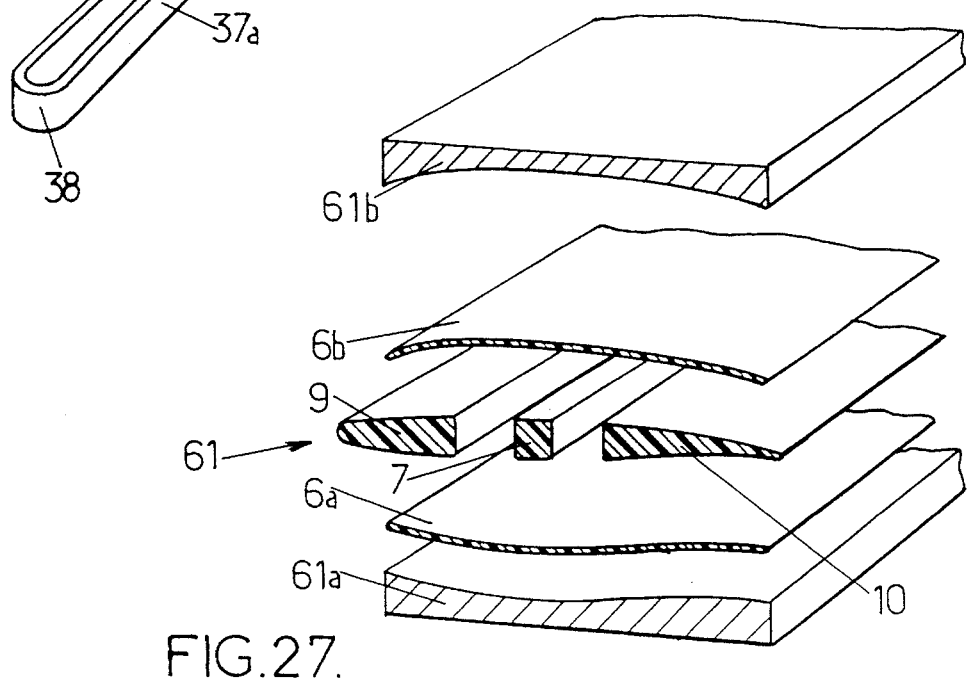
FIG. 27.

BLADE MADE OF THERMOPLASTIC COMPOSITE, IN PARTICULAR FOR DUCTED TAIL ROTOR OF A HELICOPTER, AND ITS METHOD OF MANUFACTURE

FIELD OF THE INVENTION

The invention relates to a blade, whose essential elements are made of a composite material with a matrix of synthetic rigidifying resin reinforced with inorganic or organic fibres with high mechanical strength.

In an advantageous application, such a blade is intended to equip a multiblade rotor with variable pitch and with individually dismountable blades, in particular a tail rotor, preferably a ducted tail rotor, of a helicopter.

The invention also relates to a method for manufacturing such a blade.

BACKGROUND OF THE INVENTION

Such blades already known from U.S. Pat. Nos. 4,626,172 and 4,892,462, are of the type comprising:

a composite rigid shell, with aerodynamic profile, elongated longitudinally along the span of the blade, one longitudinal end of which, intended to be turned towards the hub of the rotor, has a blade root, the said shell including at least one layer of reinforcing fibres agglomerated by a matrix made of a synthetic rigidifying resin, at least one spar, at least one part of which is housed substantially longitudinally in the shell, including at least one elongate composite bar of continuous and unidirectional reinforcing fibres agglomerated by a matrix made of a synthetic rigidifying resin, and at least one filling body arranged in the shell between the latter and at least one spar.

Furthermore, in an example of a blade described in U.S. Pat. No. 4,892,462, each filling body is also a composite body, with reinforcing fibres agglomerated by a matrix made of a synthetic rigidifying resin.

In order to be individually dismountable and with variable pitch, each blade of the aforementioned patents includes a rooting part which is deformable in torsion about an axis substantially parallel to the longitudinal axis of the blade, and by which the latter is attached to the hub of the rotor. This rooting part includes at least one elongate composite torsion bar which longitudinally extends, outside the shell, at least one composite bar of at least one spar by passing through the blade root, which is tubular, the end of the torsion bar of the rooting part which is situated on the side opposite the shell being shaped into a loop surrounding a spool which is fixed removably to the hub by a bolt. In addition, the tubular blade root includes a metallic or composite cuff, the axial ends of which are each surrounded by one of two coaxial flanges allowing clamping and mounting in rotation of the blade root in two coaxial openings made in two walls of the rotor hub, the cuff also having, between these two flanges, a pitch control lever, projecting radially outwards and intended to be articulated to a device for collective control of the pitch of the blades. Inside the cuff, the blade root consists partly of extensions of the layers of fibres agglomerated by resin, constituting the rigid shell of the blade, optionally by extensions of layers of reinforcing fibres which are agglomerated by a synthetic resin, reinforcing the shell in its part close to the blade root, and partly by filling elements and/or layers of fibre fabric or plies of fibres which are agglomerated with synthetic resin in order to reinforce the blade root.

In the two aforementioned patents, all the composite elements, in particular the shell, the spar or spars, the rooting part, at least partially the tubular blade root and, optionally, the filling body or bodies, are made in composite materials based on polymerizable organic matrices consisting of thermosetting synthetic resins, for example epoxy resins. The reinforcing fibres of these composite materials are, for each blade, of different species, and in general of glass, carbon, or alternatively aramid fibres, and these blades may furthermore include certain elements consisting of synthetic, but not composite, materials, such as polyurethane foams.

This causes problems. It may be necessary to use several thermosetting resins on the same blade, each adapted to particular reinforcing fibres, and possibly non-composite synthetic elements. However, these various thermosetting resins must be mutually compatible. Above all, the thermosetting matrices, under the effect of the temperature and/or time, undergo a chemical conversion called polymerization. This reaction creates a modification in the molecular lattice, which becomes three-dimensional, unmeltable and irreversible. During this thermal cycle, these thermosetting matrices pass successively through three steps: liquid, gel, solid. The pieces based on thermosetting matrices adopt their final shape during the rise in temperature, just before gelling of the matrix. For example, for a matrix of the class of polymerizations termed 180° C. polymerizations, this state is obtained at approximately 160° C. Beyond this point, the matrix becomes solid, and the piece has adopted its final shape. This state is irreversible.

This irreversible and unmeltable nature of the state resulting from polymerization is the cause of a number of industrial difficulties of these blades: the reject rate is high, because manufacturing methods involving such polymerization are difficult to employ and sometimes time consuming, and lead to blades being obtained which do not always have the requisite dimensional characteristics. Because of the irreversibility of the polymerization, it is impossible to recycle the rejects, and repairs, for returning components to their standard form, are time-consuming, expensive and difficult, if they are possible at all. The chemical polymerization reaction can lead to the release of toxic gases, and the reactive nature of the products involved raises problems regarding shelf-life and storage of these products. Finally, it is known that composite materials with thermosetting matrices have poor fatigue strength, shock, impact and temperature resistance, and are sensitive to moisture-induced ageing.

SUMMARY OF THE INVENTION

The basic problem of the invention is to overcome the aforementioned drawbacks of blades of the state of the art, and to provide replaceable blades, with improved reliability and reduced manufacturing cost.

Another object of the invention is to provide a blade in which the structure and production of the tubular blade root are greatly simplified compared to the examples described in U.S. Pat. No. 4,892,462.

For this purpose, the invention provides a blade of the type described in U.S. Pat. No. 4,892,462 and presented hereinabove, and which is characterized in that the resin of the matrices of the shell, of each filling body and of each bar of each spar is a thermoplastic resin, which assembles and provides cohesion between the shell, each spar part housed in the shell, and each filling body.

Pieces based on thermoplastic matrices adopt their final shapes at the instant of melting of the matrix, over a temperature range of approximately 20° C. below the melting temperature proper. On cooling, the matrix returns to its initial solid state, and the piece retains its final shape. This phenomenon is reversible.

The conversion of composite materials with thermoplastic matrices, by simply melting or softening them under the effect of heating, and without chemical alteration, allows higher manufacturing turnover of blades produced using these materials. This is even more the case since the polymerization which the composites with thermosetting matrices undergo, after draping and setting in a mould as in the methods described in the two aforementioned patents, may last 4 to 90 hours, depending on the nature and/or the thickness of the composites. In contrast, composites with thermoplastic matrices, which have no chemical or exothermic reaction during their conversion, whatever their thickness, can be employed rapidly and reversibly by an elementary method which, reduced to its simplest form, consists in heating these composites to melt the matrix, in pressing these composites to compact them and/or shape them, and then in cooling them to consolidate their matrix. These thermoplastic composites can therefore be converted with high turnover. Their reversible nature, as mentioned hereinabove, allows for repair, by heating and reshaping, of blades not in accordance with the specifications, for example the dimensional specifications, as well as for recycling the materials used. This results in a decrease in rejects. Furthermore, the matrix adheres to itself when hot. This property is particularly advantageous since it makes it possible not only to carry out localized repairs but also, as explained hereinbelow, to manufacture blades by a method consisting in assembling, by melting the matrix and under pressure, elementary pieces prefabricated by a wide range of conversion and assembly techniques (especially compacting, stamping, pultrusion and injection), starting from semifinished products made from composites with thermoplastic matrices, which are available in the trade.

Furthermore, the absence of chemical reaction and exothermic reaction makes it possible to avoid the problems of air conditioning the workshops for manufacturing the blades and their components, as well as the problems regarding storage and shelf-life of the materials in question.

All these factors contribute to a reduction in the manufacturing and operational costs of the blades.

For producing the blades according to the invention, a thermoplastic resin selected is advantageously a polyetheretherketone (PEEK) resin, and the reinforcing fibres, in particular of the shell, of the spar or spars, and of the filling body or bodies, are chosen from carbon or glass fibres, but, preferably, are all of the same nature, and in particular made of carbon.

Thermoplastic composites called "PEEK/carbon" are thus advantageously used, which, compared to the thermosetting composites of the blades of the state of the art, additionally have the advantages of good general static mechanical behaviour, and better fatigue strength, good tolerance to damage and a high resistance to the environment, and in particular insensitivity to moisture-induced ageing, very good resistance to temperature, as well as to shocks and impacts.

Furthermore, the choice of a PEEK matrix makes it possible to obtain good creep behaviour and improves the fatigue strength, which is at least twice as great as that of the various other known high-performance thermoplastic matrices which are used for producing composite materials in other applications. The choice of one and the same PEEK resin as the matrix, and of reinforcing fibres solely made of carbon, or possibly solely made of glass, for producing the various composite elements of the blade avoids any disparity with regard to the agglomeration resins and any risk of incompatibility between the various constituents, in contrast to the blades described in U.S. Pat. No. 4,892,462, in which each thermosetting resin used is adapted to the nature of the reinforcing fibres, made of glass, carbon or aramid, which it agglomerates, as well as to the nature of the synthetic material or materials, for example the polyurethane foam, with which it is placed in contact.

PEEK/carbon thermoplastic composites therefore have advantages of their behaviour in use which result from remarkable thermomechanical properties, at least of the same order of magnitude, but often even superior to those of numerous composite materials with thermosetting matrices used for producing the blades of the state of the art.

A reduction in the manufacturing and maintenance costs is thus achieved, as well as an improvement in the blades according to the invention compared to those of the state of the art.

A method of manufacturing the blade represented hereinabove is also a subject of the invention.

The method of manufacturing a blade according to the invention, in which the composite shell consists of a lower-surface skin and of an upper-surface skin which are laminated, is characterized in that it comprises the following steps, consisting:

in producing each of the thermoplastic composite components of the blade in the form of a prefabricated elementary piece, in arranging the prefabricated elementary pieces in a pressurized heat-assembly mould, comprising a lower mould part and an upper mould part including complementary internal impressions, having respectively the shape of the lower-surface part and of the uppersurface part of the blade, such that the said prefabricated elementary pieces occupy, in the mould, the respective positions which they occupy in the blade, in closing the mould and in heating the said pieces to a temperature sufficient to melt the thermoplastic matrix, under a pressure sufficient to ensure continuity of the thermoplastic matrix between the said pieces and to assemble them by pressurized melting, in cooling the mould to solidify the thermoplastic matrix, and rigidify the combination of the elementary pieces thus assembled, in releasing the blade thus obtained from the mould, and in attaching rings, by bonding or shrinking, around a blade root cuff, itself attached, by bonding or shrinking, around the said blade root if it is not made of thermoplastic composite and already assembled by pressurized melting to the other prefabricated elementary pieces of the blade.

The various elementary pieces, prefabricated by injection moulding, pultrusion, stamping and compacting, in particular, may be produced in the form of rigid elements having the appearance of board, or semirigid elements, having the appearance of sheets or plates, without tackiness, possibly starting from composite thermoplastic semi-finished products available in the trade, such as fabrics or plies of continuous or long and unidirectional glass fibres, or preferably carbon fibres, agglomerated by a thermoplastic resin, preferably a PEEK resin, or of plates obtained by superimposing and compacting several layers of such fabrics or such plies, or alternatively granulates of short reinforcing fibres contained in the dry state in a thermoplastic matrix, for example short carbon fibres in a PEEK matrix, these granulates constituting a composite material which can be injected in the molten state into the matrix.

BRIEF DESCRIPTION OF THE DRAWINGS

The invention will be better understood, and other characteristics and advantages of the invention will emerge, on reading the description which is given below of one embodiment, described by way of non-limiting example and with reference to the attached drawings, in which:

FIG. 1 is a view in side elevation of a blade for a multiblade, variable-pitch, ducted tail rotor of a helicopter, FIG. 2 is a plan view, along the arrow F in FIG. 1, of this blade, FIGS. 3 to 7 are views in cross-section, respectively along III—III, IV—IV, V—V, VI—VI and VII—VII in FIG. 2, FIG. 8 is a diagrammatic view in axial section of the root of the blade in FIGS. 1 and 2.

FIG. 9 is a partial perspective view of the blade root, of the rooting part and of the laminate attachment of the blade in FIGS. 1 and 2, FIG. 10 is a view similar to FIG. 9 of an embodiment variant, in which the spar of the blade has been modified so that its rooting part has a loop attachment, in place of the laminate attachment.

DESCRIPTION OF THE PREFERRED EMBODIMENTS

Figure 11:
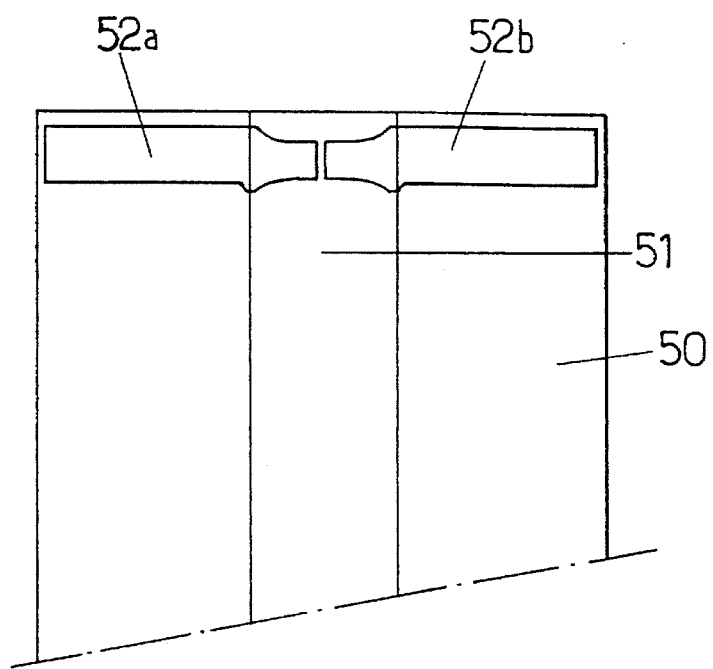
FIG. 11 is a plan view of a precompacted plate from which panels for the lower-surface and upper-surface skins of the shell of the blade in FIGS. 1 to 9 are cut out, FIGS. 12 and 13 diagrammatically represent two steps in producing the lower-surface and uppersurface skins by stamping, FIG. 14 diagrammatically represents a stamped skin in side elevation.

The blade 1 in FIGS. 1 to 9 has its main blade section or profiled part 2 extended, on the side opposite the blade tip 3, by a tubular blade root 4, passed through by a rooting part 5, by which the blade 1 is intended to be connected to a rotor hub (not shown), and which consists of a part external to the main blade section 2, of a spar 7 extending over the entire span of the blade 1.

In its main blade section 2, the blade 1 comprises:

a rigid shell 6, having the shape of the desired aerodynamic profile, and elongated longitudinally along the span, the spar 7, a straight part of which is longitudinally housed in the shell 6, along the span, and which is substantially centred on the longitudinal axis A—A of the blade, which is the axis for changing the pitch of the blade, approximately 40% along the chord from the leading edge 8, a front filling body 9 housed in the shell 6, between the spar 7 and the leading edge 8, and a rear filling body 10 housed in the shell 6, between the spar 7 and the trailing edge 11 of this blade.

In its main blade section 2, the blade may also comprise a cap (not shown) made of titanium or stainless steel, for protecting the leading edge 8.

The part of the spar 7 housed in the shell 6 has a cross-section of substantially rectangular shape, in which the longest dimension points along the chord of the blade, or is contained substantially in the plane of rotation of the blade and perpendicular to the longitudinal axis A—A, at least in the spar 7 part close to the blade root 4 (see FIGS. 3 and 5), although this spar 7 part may have a rectangular section as far as the blade tip 3. However, as shown in FIG. 4, and at least in the vicinity of the blade tip 3, the spar 7 has a cross-shaped section. Since the shell 6 consists of a lower-surface skin 6a and of an upper-surface skin 6b, which each extend from the leading edge 8 to the trailing edge 11, the cross-shaped section of the spar 7 makes it possible to stabilize the skins 6a and 6b on the two extreme faces of the spar 7 which are directly facing these skins 6a and 6b, when assembling the various components of the blade by melting under pressure, as described hereinbelow with reference in particular to FIG. 27. Whether its section is substantially rectangular or cross-shaped, the spar 7 is not twisted along the span, and about the pitch-changing axis A—A, which is favourable for its manufacture whilst allowing it to be given the requisite stiffnesses. On the other hand, the profiled section of the skins 6a and 6b, as well as of the front 9 and rear 10 filling bodies is progressively twisted about the axis A—A of the blade, in order to give the latter the desired twisting law, from the portion of the main blade section 2 adjacent to the root 4 as far as the blade tip 3, as represented in FIGS. 3 and 4. Thus, the presetting of the blade 1 is very easy to create with respect to the plane of rotation of the rotor.

Each skin 6a or 6b is laminated and consists, from the inside towards the outside of the shell 6, of a stack of two layers of plies of continuous and unidirectional carbon fibres which are oriented substantially along the longitudinal axis A—A and agglomerated in a polyetheretherketone matrix commonly called PEEK resin, and of a layer of fabric of carbon fibres which are agglomerated in the same PEEK resin, and in which the directions of the warp and weft yarns are oriented substantially at 45° with respect to the longitudinal axis of the blade. The PEEK resin is a thermoplastic polymer with aromatic structure, containing few hydrogen atoms and having a crystalline structure, a glass transition temperature of approximately 150° C., and a melting temperature of the order of 390° C.

As a variant, each of the skins 6a and 6b may consist of a stack comprising more than one layer of carbon fibre fabric, over the two layers of plies of unidirectional carbon fibres. Whatever the number of layers of fibres forming the laminated stack of each skin 6a or 6b, all these layers are agglomerated by the rigidified PEEK resin, so as to form a box which ensures, after it is filled, the torsional rigidity of the blade 1.

The front 9 and rear 10 filling bodies each consist of a pultruded profiled section of continuous and unidirectional carbon fibres which are oriented substantially parallel to the longitudinal axis A—A and agglomerated by the PEEK resin.

The spar 7 consists of a single composite and elongate hank of continuous and unidirectional carbon fibres which are oriented longitudinally along the axis A—A and are also agglomerated by the PEEK resin. This hank is arranged, in the shell 2, in an elongate strip of solid section, being of rectangular or cross shape in a portion of varying length, from the edge of the blade tip 3, but always rectangular in its portion adjacent to the blade root 4. By the upper and lower faces of this hank, the spar 7 is rigidly bound, either directly, or via the injected filling bodies 9 and 10 of the same nature, to the shell 6 in which it is received. This hank is extended axially out of the shell 6, passing through the tubular root 4, and thus forms, by its part which leaves the profiled part 2, the rooting part 5 of this blade. At the level of the transition region 12 by which the shell 2 connects with the root 4, which extends it axially, the rectangular-section hank of the spar 7 is subdivided into two equal bars 13a and 13b, each also having the shape of a strip of rectangular section, which move progressively away from each other in a direction perpendicular to the longer dimension of their sections, as well as to that of the rectangular part of the spar 7 in the shell 6. At the axial end of the rooting part 5, on the side opposite the root 4, the two bars 13a and 13b of this rooting part 5 each have an end linkage portion 14a or 14b parallel to the end linkage portion of the other bar 13a or 13b, and by which each of the bars 13a and 13b is solidly attached to a common laminate attachment 15 which constitutes the attachment for linking the rooting part 5 to a rotor hub (not shown). The two blade attachment bars 13a and 13b, which are elongated substantially in the longitudinal extension of the shell 6 and of the spar 7 part internal to this shell, each has the same composite structure as the spar 7 part internal to the shell 6, with which they are integral, and each of the bars 13a and 13b can be twisted about its longitudinal axis, so that the rooting part 5 can itself be twisted about the longitudinal axis A—A.

Such a blade, with a rooting part consisting of several elongate composite torsion bars, in which the end portions for linkage to the hub are solidly attached to the same laminate attachment, for linking to a rotor hub whose structure comprises means adapted for retaining such a laminate attachment, is more precisely described in a parallel U.S. patent application Ser. No. 08/165,861 of the Applicant Company, which may be referred to for further details on producing the laminate attachment as well as on the structure of the hub and the mounting of the laminate attachment on the hub.

It will be recalled that the laminate attachment 15 comprises a lower laminate element 15a, an upper laminate element 15b and an intermediate laminate element 15c, which are arranged in line above each other, so that the end portion 14a of the lower strip 13a is sandwiched between the lower 15a and intermediate 15c laminate elements, and that the end portion 14b of the upper strip 13b is sandwiched between the intermediate 15c and upper 15b laminate elements. Each of the laminate elements 15a, 15b and 15c consists of a stack of several layers of fabric of carbon fibres which are agglomerated by PEEK resin, and in which the directions of the warp and weft yarns are oriented substantially at 45° with respect to the longitudinal axis of the strip 13a or 13b, or of a stack of several layers of plies of continuous and unidirectional carbon fibres which are agglomerated by PEEK resin, the plies being alternately crossed with each other in the stack, so that the direction of the unidirectional fibres of one ply is substantially perpendicular to the direction of the fibres of the adjacent ply or plies, the orientation of the plies of the stack being such that the unidirectional fibres of the various plies extend substantially at 45° with respect to the longitudinal axis of the bar 13a or 13b. For example, each of the lower 15a and upper 15b laminate elements may consist of the stack of nine layers of fabric or of sixteen plies, or alternatively, as a variant, of a stack comprising layers of fabric and layers of ply. The intermediate laminate element 15c is a stack consisting of the same layers of fabric and/or layers of ply, but in which the thickness is twice that of the lower 15a and upper 15b laminate elements, the intermediate element 15c being for example produced by superimposing two laminate elements such as the lower 15a or upper 15b elements.

As represented in FIGS. 2 and 9, the three laminate elements 15a, 15b and 15c have, as seen in plan, the same laterally flared shape on the two sides of the end portions 14a and 14b, which are of substantially rectangular shape in the extension and at the end of the strips 13a and 13b.

The flared shape of each laminate element 15a, 15b and 15c with respect to the end portions 14a and 14b is delimited by the side faces of these elements, which project laterally with respect to the end portions 14a and 14b and which have, in the part of each laminate element which is turned towards the shell 6, a concave region 16, with concavity turned laterally on one or other side of the blade and towards the shell 6, whereas in the end part of the laminate elements 15a, 15b and 15c which is turned from the side opposite the shell 6, the side faces of these laminate elements have planar regions 17 which converge towards each other, delimiting on the laminate elements an end part of substantially trapezoidal shape.

In order to fill the space delimited between the parts of two neighbouring laminate elements 15a, 15b and 15c which project with respect to the end portions 14a and 14b, the laminate attachment 15 also comprises four laminate side filling elements, two of which, 18a (see FIG. 9) are each arranged bearing against one of the side faces of the end portion 14a, and sandwiched between the projecting side parts of the lower 15a and intermediate 15c laminate elements, the other two 18b of which are each arranged bearing against one of the side faces of the end portion 14b and sandwiched between the laterally projecting parts of the intermediate 15c and upper 15b laminate elements. The laminate side filling elements 18a and 18b have a laminate structure similar to that of the other laminate elements 15a, 15b. 15c, i.e. of PEEK/carbon composite, and their side face opposite the one by which they are each applied against one of the end portions 14a and 14b also has, like the side faces of the laminate elements 15a, 15b and 15c, a concave region 19, which is in the extension of the concave regions 16 of the laminate elements 15a, 15b and 15c, as well as a planar region 20, which is in the extension of the planar regions 17 of the laminate elements 15a, 15b, 15c and which is therefore convergent with the planar region 20 of the other corresponding laminate side filling element 18a or 18b.

All the laminate elements 15a, 15b, 15c, 18a, 18b of the laminate attachment 15 are solidly attached to the end portions 14a and 14b of the two strips 13a and 13b of the rooting part 5 by the rigidification of the PEEK resin, which agglomerates all the reinforcing carbon fibres, in layers of plies of unidirectional fibres or fabric, which constitute the laminate elements of the attachment 15 as well as the strips 13a and 13b and their end portions 14a, 14b.

In order to facilitate production of the spar 7 with integrated rooting part 5, the single composite hank of the spar 7 is formed by two bars of the same kind, each consisting of a pultruded strip comprising several superimposed plies of continuous and unidirectional carbon fibres which are oriented along the axis A—A of the blade and are agglomerated by the PEEK resin, it being possible for the various superimposed plies of fibres of each strip to be obtained by superimposing an equal number of equal lengths cut out from a tape of PEEK/carbon composite, with unidirectional and longitudinal carbon fibres. The two pultruded strips are held spaced apart over part of their length forming the rooting part 5 using the laminate attachment 15, with which they are solidly attached by their corresponding end, whilst, over the rest of their length, these two pultruded strips are superimposed, with interposition of three plies of unidirectional and longitudinal carbon fibres which are agglomerated by the PEEK resin, to constitute the part of the spar 7 received in the shell 6.

In use, the centrifugal forces exerted on the blade 1 stress the spar 7 longitudinally, so that its laminate attachment 15 comes to abut, via the concave recesses formed laterally on the two sides by the side faces 16 and 19 of its laminate elements, against bushes, at least one of which is removable to allow individual dismounting of the blade, which bushes are solidly attached to the hub and are each situated on one of the sides of the rooting part 5, extending in a direction substantially perpendicular to the plane of rotation of the blade, which is substantially parallel to the upper and lower long faces of the laminate elements and of the torsion strips of the rooting part 5.

The root 4, represented in section in FIG. 8, comprises two complementary half-casings 21a and 21b, each of which has the shape of half a tube, of variable section, cut out axially through a diametral plane, and these half-casings 21a and 21b are bonded against each other by their longitudinal edges, so as to reconstitute the tube segment, and each consist of an axial extension of one, respectively, of the two skins 6a and 6b of the shell 6. Each half-casing 21a or 21b is laminated and comprises not only the various layers of fabric and plies of fibres which are agglomerated by the PEEK resin which constitute the skin 6a or 6b which it extends, but at least one additional reinforcing layer, located at this extension, which is for example a layer of PEEK/carbon fabric, in which the directions of the warp and weft yarns are, for the one part, substantially parallel to, and, for the other part, substantially perpendicular to the longitudinal axis A—A of the blade, this or these additional reinforcing layers lying over the other layers of the skin.

In order to rigidify the root 4 by giving it sufficient thickness, these half-casings 21a and 21b are internally reinforced by a tubular collar 22. This collar 22 has an axial and central passage 23, which is passed through by the two strips 13a and 13b of the rooting part 5, in proximity to and at the level of their subdivision from the spar 7 strip in the shell 6, and this passage 23 is delimited by an internal side surface of substantially frustoconical general shape, with a small base turned towards the shell 6. The collar 22 also has an external side surface of general shape which is also substantially frustoconical, but with a long base turned towards the shell 6, and therefore with opposite conicity to that of the internal passage 23. The collar 22, which is surrounded by the half-casings 21a and 21b, the shape of which corresponds to that of the external side surface of the collar 22 against which they are applied, therefore tapers progressively from its end adjacent to the shell 6 to its end turned towards the laminate attachment 15.

The half-casings 21a and 21b and the internal reinforcing collar 22 are surrounded and solidly attached by a bearing for clamping and rotation of the root 4 on a hub, which bearing consists of a cuff 24 for controlling the pitch of the blade. This cuff 24, not shown in FIG. 9 but seen in FIGS. 1, 2 and 8, has a substantially frustoconical general shape, with the long base turned towards the shell 6, at its internal and external side surfaces. The conicity of its central passage substantially corresponds to that of half-casings 21a and 21b and of the external surface of the collar 22. In order to allow its articulation to a device for collective control of the pitch of the blades of a variable-pitch multiblade hub comprising a plurality of blades such as the blade 1, the cuff 24 includes, projecting radially outwards, a pitch control lever 25. This lever 25 is pierced with an opening 26 for housing a ball joint for linking the collective pitch control device, in a manner described in the aforementioned parallel application, as well as in the aforementioned patents, which may be referred to for further details on this mounting and on the structure of the collective pitch control device.

Figure 14:

This cuff 24 may be a metallic cuff, as described with reference to FIG. 14 in the aforementioned U.S. Pat. No. 4,892,462, and its mounting may correspond to the representation in FIG. 16 of the same patent, the metallic cuff 24 then being attached by bonding or shrinking on the root of the assembled blade. In a known manner, shrink-mounting is carried out by heating the cuff 24, fitting it over the blade root, then cooling it.

But, in a preferred embodiment which saves weight, the cuff 24, like moreover the internal reinforcing collar 22, is a piece injection moulded from a composite of short reinforcing carbon fibres which are embedded in the PEEK matrix, which is filled to approximately 30% by mass with reinforcing fibres.

Finally, the cuff 24 is solidly attached and surrounded, at each of its axial ends, by a ring 27 or 28, made of metal or ceramic, which constitutes a bearing surface for rotation of the cuff 21 on the hub, these rings 27 and 28 being solidly attached to the cuff 21 by bonding or shrinking.

The blade 1 is thus such that all its components, with the exception of the rings 27 and 28 and, possibly, the cuff 24, are made of PEEK/carbon composite, the assembling of the various components and the cohesion of the blade being ensured by the PEEK resin.

A variant of this blade is represented in FIG. 10. The blade 31 according to this variant differs essentially from that in FIGS. 1 to 9 only by the structure of its rooting part 35 which is no longer fitted with a laminate attachment but with a rooting part 35 with linkage loop. In this variant, the spar 37 also consists of a hank of continuous and unidirectional reinforcing carbon fibres which are agglomerated by the PEEK resin, and which has two parallel parts bonded to each other along the longitudinal axis of the blade 31 to constitute two bonded spar bars which are received in the shell 36 in the main blade section or profiled part 32 of the blade 31. These bars of the spar 37 are joined to each other by a substantially flattened loop part which constitutes the rooting part 35 proper, and of which the end external to the shell 36 is rolled into a loop 38 and forms a loop attachment for linkage to the hub (not shown) to surround a bush by which the blade 31 is intended to be individually and removably attached to the hub by a bolt, in the manner described in the aforementioned patents. This loop attachment 38 is connected to the two spar bars 37 received in the shell 36 by two hank parts forming two attachment torsion bars 37a and 37b of the rooting part 35. For the rest of the structure of this blade 31, it also has in the shell 36 a front filling body (not shown) and a rear filling body 40 which are pultruded bodies made from PEEK/carbon composite with long and unidirectional fibres, the shell 36 is produced like the shell 6 of the blade 1, the root of the blade 34, represented in FIG. 10 without the pitch control cuff and its rotation rings, also comprises laminated half-casings 41a and 41b extending the laminated lower-surface and upper-surface skins of the shell 36, with at least one additional layer of reinforcing PEEK/carbon fabric, and an internal reinforcing collar 42, injection moulded from PEEK/carbon composite with short reinforcing fibres.

The method of manufacture of the blade in FIGS. 1 to 9 comprises an essential step of assembling by melting under pressure the PEEK/carbon composite components of the blade, after these components have been prefabricated in the form of elementary pieces.

In order to produce each lower-surface or upper-surface skin 6a or 6b in the form of a prefabricated PEEK/carbon composite elementary piece, the first step is to produce a plate 50 (see FIG. 11) constituted by superimposing the same number of rectangular planar layers in the semirigid state of carbon fibres agglomerated by the PEEK resin as there are layers in the skins 6a and 6b, these layers being of the same kind, that is to say, for the example in question, two layers of plies of continuous and unidirectional carbon fibres which are oriented along the width of the plate 50, the direction of which corresponds to the longitudinal direction or span of the shell 6, and which is twice as great as the span of this shell 6, and at least one upper layer of fabric of carbon fibres which are agglomerated by the PEEK resin and in which the directions of the weft and warp yarns are inclined at 45° with respect to the width of the plate 50. The stack also comprises at least one reinforcing band 51, also in the semirigid state, of fabric of carbon fibres which are agglomerated by the PEEK resin, but in which the directions of the warp and weft yarns are oriented, for the one part, along the width and, for the other part, along the length of the plate 50, this band or these bands 51 extending longitudinally across the central part of the plate 50 which central part is intended to form the half-casing 21a and 21b extensions of the skins 6a and 6b of the shell 6.

The stack of these layers and bands is heated to a melting temperature of the PEEK matrix, of the order of 400° C., and subjected to low pressure, of the order of 0.1 to 0.5 MPa, in a compacting mould, in order for the PEEK matrix to bind together the various layers and bands of fibres. The stack is then cooled and a precompacted plate 50, made of PEEK/carbon composite in substantially rigid state is obtained by solidifying the PEEK resin, from which plate panels such as 52a and 52b, arranged substantially end-to-end along the width of the plate 50 and turned towards each other by the extensions intended to form the half-casings 21a and 21b of the blade root, are cut out using a fluid jet, each of these panels 52a and 52b having the shape, developed flat, respectively of the lower-surface 6a and upper-surface 6b skin.

Each flat panel 52a or 52b is then shaped to the form desired for the corresponding lower-surface 6a or upper-surface 6b skin by stamping in a stamping mould.

Figure 12:
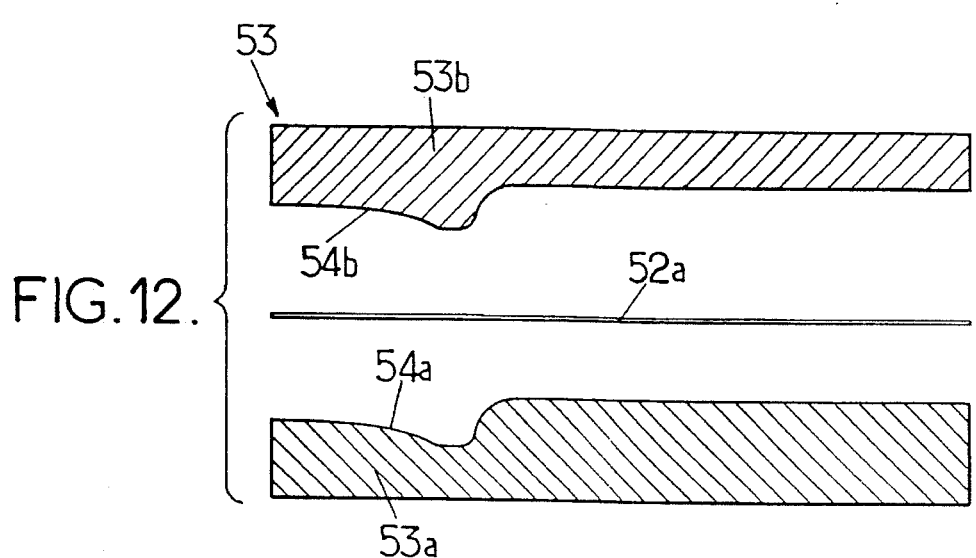
Figure 13:
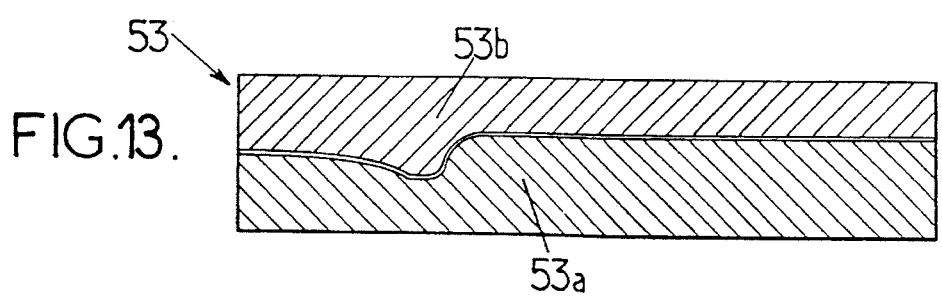

This stamping method is employed as represented in FIGS. 12 and 13, in a stamping mould including a lower mould part 53a, forming a die, and an upper mould part 53b, forming a punch, each having respectively one of two complementary impressions 53a and 53b corresponding to the internal and external shapes of the laminated skin 6a or 6b which this stamping mould 53 makes possible to produce.

Figure 15:
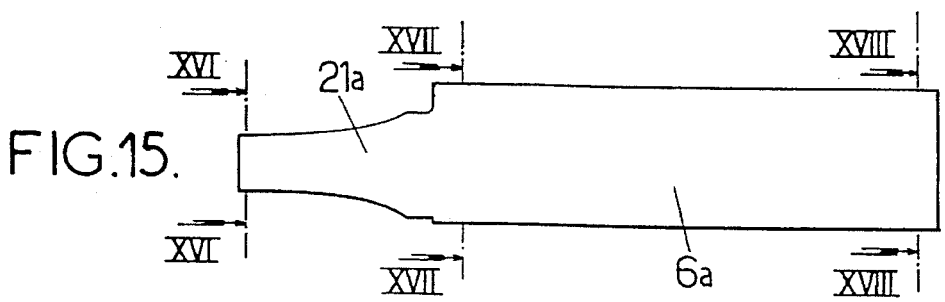
FIG. 15 represents this skin in plan along the arrow F in FIG. 14, FIGS. 16, 17 and 18 represent views in cross-section, respectively along XVI—XVI, XVII—XVII, XVIII—XVIII in FIG. 15.
Figure 16:
Figure 17:
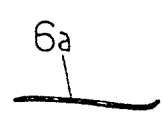
Figure 18:

By way of example, the stamping mould 53 in FIGS. 12 and 13 allows shaping of the lower-surface skins 6a. The impression 54a internal to the lower mould part 53a thus corresponds to the external shape of the lower-surface skin 6a, whereas the impression 54b internal to the upper mould part 53b corresponds to the internal shape of this same lower-surface skin 6a. In FIG. 12, the flat panel 52a is arranged between the two mould parts 53a and 53b which are separated from each other and each held at a temperature lower than the melting temperature of the PEEK matrix, for example of the order of 150° C., this flat panel having the same structure as the lower-surface skin 6a but the shape of the latter as developed flat. This panel 52a is arranged in the mould 53 after preheating to a temperature of the order of 400° C., for example using infrared or by passing through a tunnel furnace with pulsed hot air, then the two half-moulds 53a and 53b are closed, as represented in FIG. 13, to shape the lower-surface skin 6a to the desired profile. After cooling in the closed mould 53, the PEEK matrix solidifies, the mould 53 is opened and the lower-surface skin 6a can be released from the mould, as represented in FIGS. 14 and 15. The sections in FIGS. 17 and 18 represent the change in the twisting of this lower-surface skin 6a in the main blade section 2, and the section in FIG. 16 shows the half-casing 21a formed in the axial extension of the lower-surface skin 6a.

The upper-surface skin 6b is made in the same manner by stamping a panel 52b in a stamping mould similar to the mould 53, in which the impressions of the two parts of the mould correspond respectively to the external shape and to the internal shape of this upper-surface skin 6b.

The elementary piece constituting the PEEK/carbon composite collar 22 is produced by injection moulding.

It is known to mould pieces made from thermoplastic reinforced with fibres by injection starting with a semi-finished product in the form of powder or granulates on an injection moulding machine and using a manufacturing cycle which includes five main steps: namely, plasticizing the material, closing the mould, filling the mould under pressure, cooling and mould release of the piece.

Since all the devices necessary for implementing these steps are known, the tooling for injection moulding of the collar 22 will not be described further, because it has no novelty, considering the simple geometry of the collar 22 (tubular piece with generally frustoconical internal and external side surfaces, which can be moulded easily in a single piece or in two halves).

It is however, recommended for the collar 22 to be injection moulded from a composite material based on granulates of PEEK matrix in which short carbon fibres are embedded. These granulates of thermoplastic PEEK/carbon composite are semi-finished products available, for example, under the brand names 150CA30 or 450CA30 from the British Company ICI and its subsidiaries. They are granulates with a length of 2 to 4 mm and a diameter of 1 to 3 mm, of PEEK resin filled to approximately 30% by mass of carbon made in short fibres contained in the dry state in the PEEK resin. Before any use, these granulates are baked at a temperature of approximately 150° C. for at least three hours. These granulates are then heated to a melting temperature of the PEEK matrix, of the order of 400° C., and the composite material fluidized by melting its matrix is then injected into the mould, maintained at a temperature lying between approximately 150° C. and approximately 200° C., but preferably close to 150° C. After cooling and solidification of the PEEK resin, the collar 22 can be released from the mould. The mechanical characteristics of the hot-injectable composite material thus constituted are highly satisfactory since under conditions of use at an ambient temperature of 23° C., for example, the tensile YOUNG's modulus is 24,000 MPa, and the static tensile breaking strength close to 200 MPa. It will be observed that these values are of the same order of magnitude as those of a balanced glass fabric, that is to say with the same percentage of fibres in the warp and weft directions, for example a glass fabric of type E with 55% of fibres by mass, whose YOUNG's modulus and static tensile strength are respectively of the order of 20,000 MPa and 300 MPa. The composite PEEK/carbon material resulting from hot injection starting with the granulates described hereinabove therefore has remarkable characteristics for an injected material. Furthermore, these granulates contain 24% by volume of fibres and 76% by volume of PEEK resin, and their density is of the order of 1.41 to 1.44 kg/dm$^3$. The PEEK matrix has itself a tensile strength of the order of 90 to 100 MPa, and a breaking strain of 70%, a YOUNG's modulus of the order of 4000 MPa, a glass transition temperature of 143° C. and a melting temperature of 390° C. The reinforcing fibres are high-strength carbon fibres of the brand name "XAS" from the British Company COURTAULDS, with a length of the order of 0.1 to approximately 0.5 mm. The injectable thermoplastic PEEK/carbon composite thus obtained has very good static mechanical characteristics, good thermal resistance and no sensitivity to moisture-accelerated ageing.

When the cuff 24 is not metallic but made of PEEK/carbon thermoplastic composite, the elementary piece constituting it is produced, like the collar 22, by injection moulding, in a mould (not shown because it is of very simple shape since it corresponds to the frusto-conical shape of the cuff 24) heated to a temperature of the order of 150° C., of a composite material with short carbon fibres embedded in a molten PEEK resin, obtained by heating granulates such as described hereinabove to a temperature of the order of 400° C.

The elementary piece constituting each of the front 9 and rear 10 filling bodies made of PEEK/carbon composite is produced by pultrusion of a profiled section of continuous and unidirectional carbon fibres which are agglomerated by the PEEK resin.

It is known that pultrusion is a manufacturing method using extrusion by drawing which is specific to organic-matrix composite materials and which makes it possible to produce solid or hollow profiled sections continuously and with constant section. This method is therefore well suited to producing the front 9 and rear 10 filling bodies of the blade 1 since the chord of the latter is substantially constant. This method essentially consists in pulling continuous reinforcing fibres, in the form of carbon rovings, through a resin imprenation tank, then a heated extrusion die, in which the shaping by compacting of the pultruded profiled section of PEEK resin enclosing the carbon rovings is carried out. These pultruded profiled sections may have high levels, of the order of 40 to 60%, of reinforcing fibres by volume, and therefore good mechanical performance in the longitudinal direction. Pultrusion also makes it possible to mould laminated profiled sections continuously, the profiled sections being worked by drawing plies of impregnated fibres through an extrusion die. When passing through the heated extrusion die, the plies are compacted and form, on leaving, a profiled section with precise dimensions and a good surface texture. This method therefore makes it possible to use solid profiled sections from PEEK resin and continuous and unidirectional carbon fibre reinforcement constituting the front 9 and rear 10 filling bodies of the blade. The pultrusion line allowing these profiled sections to be produced is conventional, and is therefore not described in detail.

Such pultruded profiled sections, with excellent dimensional stability, have remarkable rigidity as well as good absorption of the vibrations when they are subjected to fatigue stresses. These pultruded profiled sections are therefore appropriate to be used as filling bodies in blades which are mechanically and thermally stressed to a high degree over long lifetimes.

Figure 19:
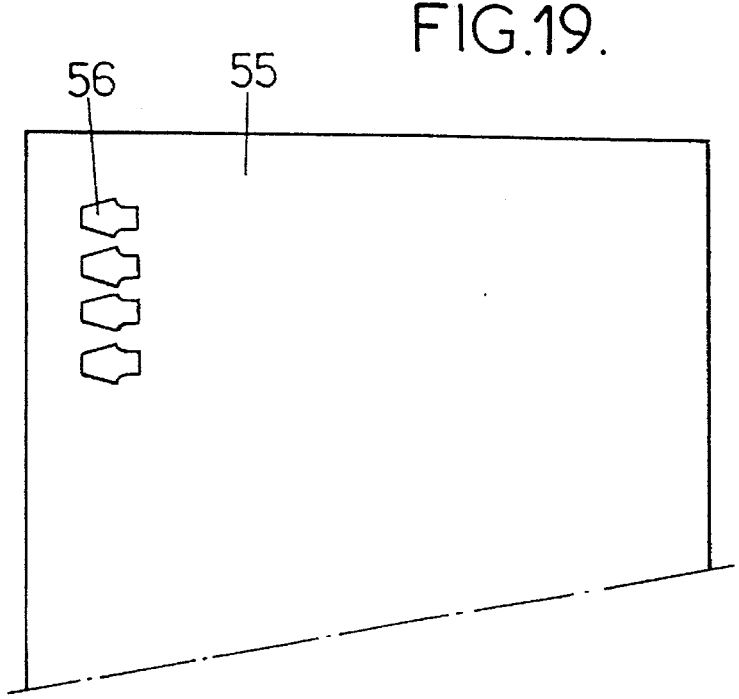
FIG. 19 represents, in plan, a precompacted plate from which laminate elements of the laminate attachment of the blade according to FIGS. 1 to 9 are cut out, FIGS. 20 and 21 diagrammatically represent the steps of the manufacturing of the spar with laminate attachment of the blade according to FIGS. 1 to 9, FIGS. 22 and 23 diagrammatically represent, respectively in plan and in side elevation, the manufactured spar.

The PEEK/carbon composite elementary piece constituting the spar 7 with an integrated rooting part 5 having a laminate attachment 15 is made in the following manner. A plate 55 is produced (see FIG. 19) by stacking, for example, sixteen rectangular layers in the rigid state of plies of continuous and unidirectional carbon fibres which are agglomerated by the PEEK resin, the plies being crossed from one layer to the next in the stack so that the orientation of the fibres of one layer is perpendicular to that of the fibres of the neighbouring layer or layers in the stack, and that the orientations of the fibres of the various plies are substantially at ±45° with respect to the direction of the length or of the width of the plate 55. The stack is then compacted in a compacting autoclave, in which the stack is heated to a temperature of the order of 400° C. to melt the PEEK resin, and it is subjected to a pressure of the order of 0.1 to approximately 0.5 MPa, exerted by a press in the autoclave or by the "vacuum bag" technique, that is to say that the stack is arranged in a leaktight bladder made of a polyimide film, for example of brand name UPILEX S, which withstands the melting temperature of the PEEK matrix, this bladder being connected to a reduced pressure source which makes it possible to create a relative vacuum in the bladder in order to compact the stack. Next, after cooling and solidifying the PEEK resin, which solidly binds all the layers of the stack, a precompacted plate 55 is obtained, from which laminate elements 56 are cut out using a fluid jet, each of which elements has a shape and a structure allowing it to constitute the lower 15a or upper 15b laminate element of the laminate attachment 15, while two superimposed laminate elements 56 are necessary to construct the intermediate laminate element 15c of this laminate attachment 15.

As a variant, the plate 55 may be constructed by compacting nine layers of fabric of carbon fibres which are agglomerated by the PEEK resin, in which the directions of the weft and warp yarns are inclined at ±45° with respect to the width or the length of the plate 55.

The laminate side filling elements 18a and 18b of the laminate attachment 15 are also cut out using a fluid jet from the plate 55, or, if necessary, from another similar precompacted plate with suitable thickness.

Figure 20:
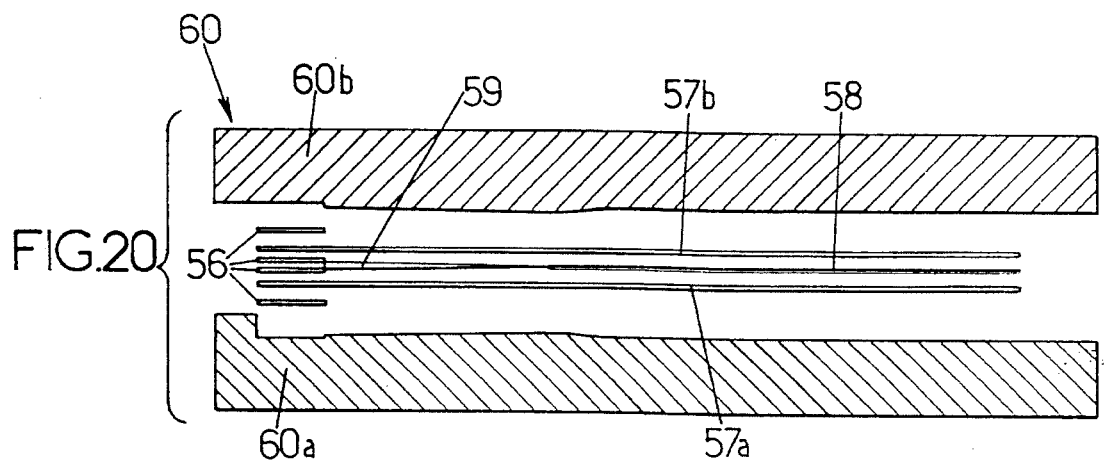
Figure 21:
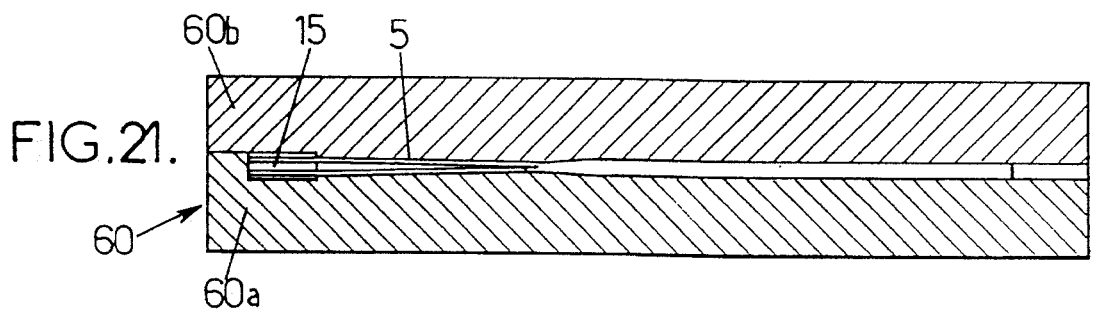
Figure 22:
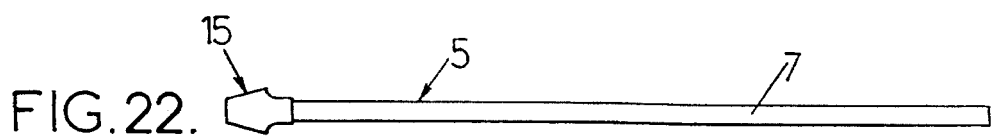
Figure 23:
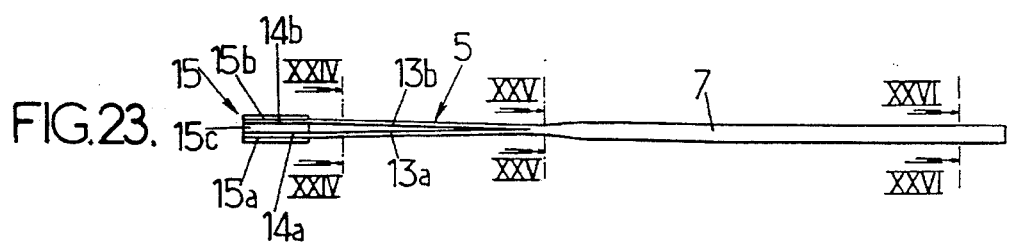
Figure 24:
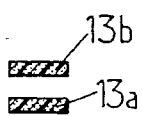
FIGS. 24, 25 and 26 represent views in cross-section, respectively along XXIV—XXIV, XXV—XXV, XXVI—XXVI in FIG. 23 and FIG. 27 diagrammatically represents the fitting of the various thermoplastic composite components of the blade in FIGS. 1 to 9 in a mould for assembly by melting under pressure, for producing the blade starting from prefabricated components.
Figure 25:
Figure 26:
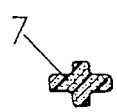

The actual spar 7 consists essentially of two strips produced by pultrusion from continuous and unidirectional carbon fibres which are agglomerated by the PEEK resin. Each strip is a pultruded profiled section manufactured in the same manner as the front 9 and rear 10 filling bodies, by the known method and using a known device, from tapes or plies of continuous, unidirectional and longitudinal carbon fibres which are agglomerated by the PEEK resin, by passing through an extrusion die heated to a temperature of approximately 400° C. to melt the PEEK matrix. Each of the two identical pultruded strips 57a and 57b of the spar 7 consists for example of a pultruded profiled section with sixteen plies of such fibres. As represented in FIG. 20, the pultruded strips 57a and 57b are arranged in a mould 60 for compacting the spar 7, which comprises a lower mould part 60a and an upper mould part 60b which each have an internal impression respectively having the shape of the lower part and the upper part of the manufactured spar 7, except at the laminate attachment 15, for which the corresponding impression is essentially made in the lower part of the mould 60a. The strips 57a and 57b are super-imposed, along the part of their length which is to be received in the shell 6, with the interposition between them of three plies 58, in the semirigid state, of continuous and unidirectional carbon fibres which are oriented longitudinally and are agglomerated by the PEEK resin. In order to hold the parts of the length of the two strips 57a and 57b which are to constitute the torsion strips 13a and 13b of the rooting part 5 away from each other, a steel wedge-shaped tool 59 is interposed between these parts of the strips 57a and 57b. Then each of the end portions of these separated parts of the strips 57a and 57b, which end portion is intended to form the end linkage portion 14a or 14b of the corresponding torsion strip 13a or 13b, is sandwiched between two prefabricated laminate elements 56, as cut out from the precompacted plate 55 in FIG. 19. The two laminate elements 56 thus directly superimposed from each other, between the end portions of the separated parts of the two strips 57a and 57b, are arranged directly behind the steel wedge 59, on the faces of which an aerosol mould release agent, for example of the type known under the name "FREKOTE", is vaporized before fitting. This layer of mouldrelease agent has the effect of facilitating withdrawal of the removable tool consisting of the steel wedge 59 after compacting of the spar. This compacting is carried out by closing the mould, as represented in FIG. 21, while all the composite elements contained in the mould are heated to a temperature of the order of 400° C. to melt the PEEK matrix, and these components are simultaneously subjected to a pressure of the order of 0.6 MPa. The three plies of unidirectional fibres 58, which are arranged facing the end of the removal wedge 59, and which are integrated in the spar 7 by the compacting operation, have the role of avoiding any deformation in thickness of the strips 57a and 57b of the spar, at the end of the metal wedge 59, because this end cannot have strictly zero thickness. Thus, the PEEK matrix solidly attaches the four laminate elements 56 to the ends of the separated parts of the two strips 57a and 57b of the spar, and solidly attaches the two laminate elements 56 which are directly superimposed to constitute the intermediate laminate element 15c of the laminate attachment 15, and also solidly attaches together the superimposed parts of the two strips 57a and 57b and the three intermediate plies of fibres 58. After cooling and solidifying the PEEK resin, the mould 60 is opened and the spar 7 which is compacted and manufactured in a single piece is released from the mould and has the structure represented in FIGS. 22 and 23 and such as already described hereinabove. In particular, each of the two pultruded strips 57a and 57b of the spar 7 constitutes, on the one hand, a spar bar received in the shell 6 and solidly attached to the corresponding bar of the other sheet, and, on the other hand, a blade attachment bar 13a or 13b, connected to the other by its linkage end portion 14a or 14b via the common laminate attachment 15.

With all the thermoplastic PEEK/carbon composite components having been produced in the form of prefabricated elementary pieces, these components, with the exception of the pitch control cuff 24, are arranged in a mould for pressurized fusion assembly of the blade, diagrammatically represented in FIG. 27, this mould 61 comprising a lower mould part 61a and an upper mould part 61b which include complementary internal impressions having, respectively, the shape of the lower-surface part and of the upper-surface part of the blade, the prefabricated elementary pieces being arranged in this mould such that they occupy in the latter the respective positions which they occupy in the blade 1. This operation essentially consists in first arranging the lower-surface skin 6a in the lower mould part 61a, then in arranging on the lower-surface skin 6a the front 9 and rear 10 filling bodies on either side of the spar 7, with fitting of the internal reinforcing collar 22, in a single piece or in two complementary pieces, about the rooting part 5 which, with the laminate attachment 15, are preferably positioned in this mould by a positioning tool which surrounds them and fills in particular the internal passage 23 of the collar 22, around the strips 13a and 13b, which pass through it. The prefabricated elementary pieces thus arranged are heated to a temperature of the order of 400° C., to melt the PEEK matrix, and the mould 61 is closed to exert on these pieces a pressure sufficient to ensure continuity of the PEEK matrix between the various pieces and to assemble them by melting under pressure, in a single operation, a suitable pressure being of the order of 1 MPa. Cooling the mould and its contents then ensures solidification of the PEEK matrix, and rigidification of all the elementary pieces thus assembled, and the blade thus obtained can then be released by opening the mould. To complete the manufacture of the blade, the metal or ceramic rings 27 and 28 are attached by bonding or crimping onto the cuff 24, and the latter, if it is made of metal, is itself then attached by bonding or crimping around the half-casings 21a and 21b and the internal reinforcing collar 22 of the blade root 4.

If the cuff 24 is itself a piece which is injection moulded from PEEK/carbon thermoplastic composite, it may optionally be assembled with the other components, made from PEEK/carbon composite, of the blade during the moulding operation, on condition that the consequently required impressions are made in the mould.

Similarly, a cap for protecting the leading edge, made of titanium or stainless steel for example, can be attached by bonding onto the blade after release from the mould, or solidly attached to the blade during the moulding, at the same time as assembling all the other composite elements of the blade, if the impressions of the mould 61 are arranged accordingly and the cap is fitted in the mould before it is closed, in a suitable position with respect to the other elements which it contains.

The method of manufacture of the blade variant represented in FIG. 10 differs from that which has just been described only in the step of producing the prefabricated elementary piece intended to constitute the spar 37 having a rooting part 35 with loop linkage attachment 38. Such a spar 37 can be produced according to the process described with reference to FIG. 9 of the aforementioned U.S. Pat. No. 4,892,462 which is applied to other materials. According to this method, this elementary piece is produced by rolling a tape of continuous, unidirectional and longitudinal carbon fibres which are agglomerated by PEEK resin in several layers and under mechanical tension around two spools, with axes which are parallel but spaced apart by a distance greater than the span of the blade. The mechanical rolling tension may be obtained by subjecting one of the two spools to traction which tends to separate it from the other during rolling of the strip. A hank rolled in an elongated and closed loop is thus obtained, which is shaped by compacting under pressure and at a melting temperature of the PEEK matrix, of the order of 400° C., in a mould which includes an insert to hold separately the two parts of the hank which are intended to constitute the two attachment bars 37a and 37b joined together by the loop end 38 of the spar 37. After solidifying the PEEK matrix by cooling the compacting mould and its contents, the end part of the rolling situated on the side opposite the loop attachment 38 is cut out, to return the length of the spar 37 thus obtained to the length desired along the span of the blade.

The spar 37 thus produced in the form of a prefabricated elementary piece is then fitted with the other PEEK/carbon composite prefabricated components of the blade in a mould for final assembly by melting under pressure, as described hereinabove for the blade of FIGS. 1 to 9. In this example as well, the rings of the blade root, as well as, optionally, the pitch control cuff are mounted on the blade by bonding or crimping, after moulding the latter, or integrated with the blade during the step of assembly and injection moulding.

Another advantage of the blade and of the method of the invention is that the moulding of a thermoplastic is obtained without contamination of the mould. It is therefore not necessary to place a layer of adhesive in the mould to obtain a "finished" state of the skins of the blade, as is the case when moulding the blades of the state of the art from the thermosetting composite.

We claim:

1. A blade, essentially made of composite material, for a rotorcraft rotor, and comprising:

a composite rigid shell, with an aerodynamic profile, elongated longitudinally along the span of the blade, one longitudinal end of which is turnable towards a hub of the rotor and includes a blade root, said shell including at least one layer of reinforcing fibres agglomerated by a matrix comprising a synthetic rigidifying resin, at least one spar having at least one part housed substantially longitudinally in the shell and including at least one elongate composite bar of continuous and unidirectional reinforcing fibres agglomerated by a matrix comprising a synthetic rigidifying resin, and at least one composite filling body arranged in the shell between the shell and said at least one spar, said at least one filling body including reinforcing fibres agglomerated by a matrix comprising a synthetic rigidifying resin, the resin of the matrices of the shell, of said at least one filling body and of each bar of said at least one spar comprises a thermoplastic resin, which assembles together and provides cohesion between the shell, each part of said at least one spar housed in the shell and said at least one filling body.

2. The blade according to claim 1, wherein the thermoplastic resin comprises a polyetheretherketone resin, and the reinforcing fibres are selected from the group consisting of carbon and glass fibres.

3. The blade according to claim 2, wherein the reinforcing fibres of the shell of the at least one composite filling body and of each composite bar of the at least one spar comprise carbon.

4. The blade according to claim 1, wherein said at least one filling body of the blade comprises continuous and substantially unidirectional reinforcing fibres which are agglomerated by said thermoplastic resin.

5. The blade according to claim 1, wherein the blade root is tubular and extends the shell substantially axially, the blade root comprising two complementary half-casings, each of said half-casings comprising an extension of one of two laminated skins respectively, which form the lower-surface and upper-surface skins of the blade.

6. The blade according to claim 1, further comprising a blade rooting part including at least one blade attachment bar which is elongate, composite, and twistable about a longitudinal axis, and extends outside the shell by passing through the blade root, the at least one composite bar of the at least one spar having a longitudinal axis substantially parallel to that of the blade, the end of the at least one attachment bar, on the side opposite the shell, being arranged in linkage attachment to the rotor hub, that at least one attachment bar of the rooting part being integral with the composite bar of the spar and comprising reinforcing fibres agglomerated by the thermoplastic resin.

7. The blade according to claim 6, wherein the at least one spar comprises a hank of continuous and unidirectional reinforcing fibre agglomerated by said thermoplastic resin, and includes two parts substantially parallel to each other and to the longitudinal axis of the blade, which constitute two spar bars received in the shell and joined to each other by a substantially flattened loop part which comprises the rooting part, of which an end rolled into a loop forms a loop attachment for linkage to the hub, to surround a bush by which the blade is individually and removably attachable to the hub by a bolt, said loop attachment being connected to said spar bars received in the shell by two hank parts forming two attachment torsion bars of the rooting part.

8. The blade according to claim 6, wherein the attachment for linking the at least one attachment bar to the hub comprises a laminate attachment comprising at least two laminate elements between which an end linkage portion of the attachment bar, on the side opposite the shell, is sandwiched and solidly attached, each of said laminate elements comprising a stack of at least two layers of the same reinforcing fibres as those of the attachment bar, agglomerated by said thermoplastic resin which solidly attaches said laminate elements to said end linkage portion, the laminate attachment being shaped to abut, towards the shell, against movable means for holding the laminate attachment and the blade to the hub.

9. The blade according to claim 8, wherein the at least one attachment bar comprises at least one pultruded strip of continuous and unidirectional fibres in said thermoplastic resin, said unidirectional fibres being oriented substantially along the longitudinal axis of the attachment bar, each of the laminate elements of the laminate attachment comprising a stack of several layers of at least one of crossed plies of continuous, unidirectional fibres or layers of fibre fabric, such that directions of the fibres are substantially at 45° with respect to the longitudinal axis of the attachment bar.

10. The blade according to claim 6, wherein the blade root includes a bearing for clamping and rotation of the blade root on the hub, said bearing comprising a blade root cuff including, projecting radially outwards, a pitch control lever for articulation to a device for collective control of pitch of blades of the rotor, the cuff comprising a tubular cuff moulded from a composite of short reinforcing glass or carbon fibres embedded in the thermoplastic matrix.

11. The blade according to claim 10, wherein the blade root includes an internal reinforcing collar moulded from a composite of short reinforcing glass or carbon fibres embedded in the thermoplastic resin.

12. A method for manufacturing a blade for a rotorcraft rotor comprising a composite shell having a blade rooting part and a lower-surface skin and an upper-surface skin which are laminated, at least one spar and a composite filling body arranged in the shell between the shell and the at least one spar, the method comprising:

producing thermoplastic composite components of the blade in a form of prefabricated elementary pieces;

arranging the prefabricated elementary pieces in a mould for assembly by heating under pressure, the mould comprising a lower mould part and an upper mould part including complementary internal impressions having respectively the shape of the lower-surface skin and of the upper-surface skin of the blade, such that said prefabricated elementary pieces occupy, in the mould, the respective positions which they occupy in the blade;

closing the mould and heating said prefabricated elementary pieces to a temperature sufficient to melt the thermoplastic matrix, under a pressure sufficient to ensure continuity of the thermoplastic matrix between said prefabricated elementary pieces and to assemble them by melting under pressure;

cooling the mould to solidify the thermoplastic matrix and rigidify all the elementary pieces thus assembled;

releasing the blade thus obtained from the mould; and attaching rings, by bonding or by crimping, around a blade root cuff attached around said blade root if said blade root is not made of thermoplastic composite and already assembled by melting under pressure with the other prefabricated elementary pieces of the blade.

13. The method according to claim 12, further comprising the step of producing the elementary piece comprising the filling body by pultrusion of a profiled section of continuous and unidirectional fibres which are agglomerated in a thermoplastic matrix.

14. The method according to claim 12, further comprising the step of producing the elementary piece comprising the laminated lower-surface or upper-surface skin of the shell by shaping by stamping, between two mould parts held at a temperature lower than the melting temperature of the matrix, and having complementary impressions corresponding to the shape of the laminated lower-surface or upper-surface skin, of a panel preheated to a melting temperature of the matrix, having the shape, developed flat, of the laminated lower-surface or upper-surface skin, and cut out from a precompacted plate obtained by stacking several layers of fabrics or plies of continuous and unidirectional reinforcing fibres agglomerated by the matrix under pressure and at a melting temperature of the matrix, then rigidifying in a plate by solidifying the matrix by cooling.

15. The method according to claim 12, for manufacturing a blade wherein the blade root includes a pitch control cuff, and comprises a composite with thermoplastic matrix, further comprising the step of producing the elementary piece comprising the cuff by injection moulding, in a mould heated to a temperature lower than the melting temperature of the matrix, a composite material comprising short, reinforcing fibres embedded in a molten thermoplastic matrix.

16. The method according to claim 12, for manufacturing a blade wherein the blade root is reinforced by an internal reinforcing collar, and comprises a composite with thermoplastic matrix, further comprising the step of producing the elementary piece comprising the sleeve by injection moulding, in a mould heated to a temperature lower than the melting temperature of the matrix, of a composite material comprising short, reinforcing fibres embedded in a molten thermoplastic matrix.

17. The method according to claim 12, for manufacturing a blade wherein the at least one spar comprises a thermoplastic composite, and wherein a part external to the shell comprises the blade rooting part having two attachment bars forming a loop attachment for linking to the hub, extending at least one spar bar housed in the shell, further comprising the step of producing the elementary piece comprising said spar by rolling a tape of continuous and unidirectional reinforcing fibres agglomerated by said thermoplastic matrix in several layers and under mechanical tension around two spools, by shaping in a mould by compacting the winding under pressure and at a melting temperature of the matrix, followed by solidification cooling of the matrix, and by cutting out an end part of the winding on the side opposite the loop attachment.

18. The method according to claim 12, for manufacturing a blade wherein the at least one spar comprises thermoplastic composite, a part external to the shell comprises the blade rooting part with at least one attachment bar, an end portion for linkage to the hub is fitted with a laminate attachment, also comprising thermoplastic composite, and extending a spar bar housed in the shell, further comprising the steps of producing the elementary piece comprising the spar by producing each attachment bar and the spar bar extended thereby in the form of a strip of continuous and unidirectional reinforcing fibres which are agglomerated by the thermoplastic matrix, obtained by pultrusion at a melting temperature of the matrix, of several plies of continuous and unidirectional fibres which are agglomerated by the matrix, and, where said rooting part comprises at least two attachment bars, each one of which respectively extends one spar bar, superimposing parts of corresponding strips forming the spar part housed in the shell, with interposition of at least one ply of continuous and unidirectional fibres agglomerated by said matrix between the adjacent superimposed strip parts, and fitting a removable tool, in the shape of a wedge, between parts held spaced from each other by two neighboring strips, to form two attachment bars of the blade rooting part, arranging the strip parts in a mould, and inserting each linkage end portion of a pultruded strip between two laminate elements of the attachment, so as to superimpose all the laminate elements of said attachment, closing the mould and compacting its contents under pressure and at a melting temperature of said thermoplastic matrix, and solidifying the matrix by cooling to rigidify the spar thus obtained with the laminate attachment solidly attached to its rooting part.

19. The method according to claim 18, further comprising producing each laminate element of the laminate attachment comprising thermoplastic composite by stacking several layers of at least one of fabric or plies of continuous and unidirectional fibres agglomerated by said thermoplastic matrix, by compacting the resulting stack under pressure and at a melting temperature of the matrix, solidifying the matrix by cooling to obtain a compacted plate, and cutting out said laminate element from said compacted plate.

\* \* \* \* \*